United States Patent
Xu et al.

(10) Patent No.: US 9,588,808 B2
(45) Date of Patent: Mar. 7, 2017

(54) MULTI-CORE SYSTEM PERFORMING PACKET PROCESSING WITH CONTEXT SWITCHING

(71) Applicant: FREESCALE SEMICONDUCTOR, INC., Austin, TX (US)

(72) Inventors: Zheng Xu, Austin, TX (US); Tommi M. Jokinen, Austin, TX (US); William C. Moyer, Austin, TX (US)

(73) Assignee: NXP USA, INC., Austin, TX (US)

( * ) Notice: Subject to any disclaimer, the term of this patent is extended or adjusted under 35 U.S.C. 154(b) by 275 days.

(21) Appl. No.: 13/907,480

(22) Filed: May 31, 2013

(65) Prior Publication Data
US 2014/0359636 A1    Dec. 4, 2014

(51) Int. Cl.
*G06F 12/0806* (2016.01)
*G06F 9/48* (2006.01)

(52) U.S. Cl.
CPC .......... *G06F 9/4856* (2013.01); *Y02B 60/144* (2013.01); *Y02B 60/162* (2013.01)

(58) Field of Classification Search
None
See application file for complete search history.

(56) References Cited

U.S. PATENT DOCUMENTS

| | | | |
|---|---|---|---|
| 8,214,845 B2 | 7/2012 | Hoover et al. | |
| 8,332,461 B2 | 12/2012 | Shin et al. | |
| 2001/0034751 A1* | 10/2001 | Eto et al. | 709/100 |
| 2004/0078543 A1* | 4/2004 | Koning et al. | 711/173 |
| 2007/0266387 A1* | 11/2007 | Henmi | G06F 9/4843 718/102 |
| 2010/0141664 A1 | 6/2010 | Rawson et al. | |
| 2011/0099550 A1* | 4/2011 | Shafi | 718/102 |
| 2012/0230341 A1 | 9/2012 | Mital et al. | |
| 2013/0339681 A1* | 12/2013 | Prado | G06F 9/30123 712/225 |
| 2014/0006668 A1* | 1/2014 | Chew | 710/269 |

OTHER PUBLICATIONS

Tanenbaum, structured computer organization, 2006, Pearson Education Inc., 5th ed, p. 8.*

* cited by examiner

*Primary Examiner* — Emerson Puente
*Assistant Examiner* — Zhi Chen

(57) ABSTRACT

A multi-core processing system includes a first processing core, a second processing core, a task manager coupled to the first and second processing cores. The task manager is operable to receive context information of a task from the first processing core and provide the context information to the second processing core. The second processing core continues executing the task using the context information.

20 Claims, 2 Drawing Sheets

MULTI-CORE SYSTEM PERFORMING PACKET PROCESSING WITH CONTEXT SWITCHING

BACKGROUND

Field

This disclosure relates generally to multi-core systems and more particularly to processing systems with context switching.

Related Art

Multi-core processing systems often perform operations on packet data in which those operations are performed as tasks. Various cores executing a particular program are performing tasks assigned to them by a task manager. The tasks themselves may have time periods in which another resource, such as a hardware accelerator, is performing a portion, or job, of the task so that the core is not actually involved with that task. In such case the core can be used to execute another task while the job is being executed by the accelerator. When the hardware accelerator, for example, is finished with that job, the core will need to eventually continue the task. Thus it is important that the core know the last known state of the task. This type of operation in which context information is used in providing for a core to switch tasks prior to completing the task is generally referenced as context switching. Context switching provides a benefit of more use of the cores in a given amount of time. One cost of this is that there is some delay in transferring between jobs due to loading the context information of a previous task as it becomes the current task for the core. Also there is a continuous desire for increased efficiency in performing tasks more quickly and with fewer resources.

Thus, there is a continuing need for further improvements in multi-core systems in which context switching is used.

Accordingly there is a need to provide further improvement in achieving power savings of flip-flop banks while avoiding sacrificing speed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect a multi-core system not only can use context switching in order to implement the ability for a core to switch from a first task to a second task without first finishing the first task but can also perform a context swap in order to allow a second core to execute the first task and the first task was begun by the first core. This is better understood by reference to the drawings and the following written description.

Figure 1:
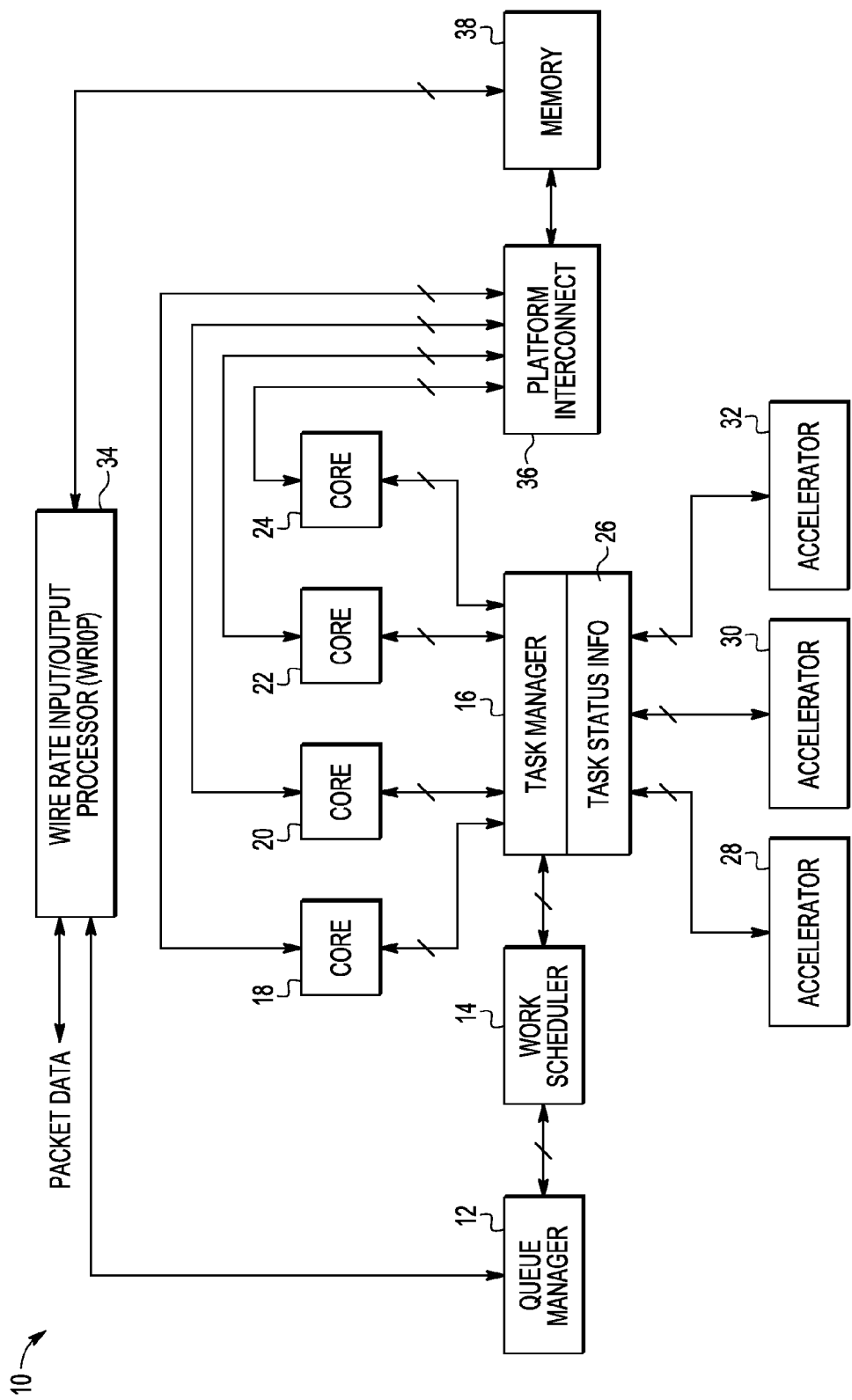
FIG. 1 is a block diagram of a multi-core system according to an embodiment.

Shown in FIG. 1 is a system 10 comprising a queue manager 12, a work scheduler 14 coupled to the queue manager, a task manager 16 coupled to the work scheduler, a core 18 coupled to task manager 16, a core 20 coupled to task manager 16, a core 22 coupled to task manager 16, a core 24 coupled to task manager 16, an accelerator 28 coupled to task manager 16, an accelerator 30 coupled to task manager 16, a platform interconnect coupled to cores 18, 20, 22, and 24, a memory 38 coupled to platform interconnect 36, and a wire rate input/output processor (WRIOP) coupled to memory 38. Cores 18, 20, 22, and 24 run the same program. A different number of cores may be used. WRIOP 34 loads information into memory 38 that is necessary for cores 18, 20, 22, and 24 running the program. Cores 18, 20, 22, and 24 access memory 38 through platform interconnect 36 as needed to perform tasks. WRIOP 34 also reads memory 38 to obtain program results. Examples of accelerators include direct memory access (DMA), table look-up (TLU), parse/classify/distribute (PCD), reassembly unit, security (SEC), work scheduler, and task termination. Included within task manager 16 is a block shown as task status info 26 which maintains the status of each task. For each task there is a core that is assigned to perform the task, a context ID, and a status. The status may be one of four possibilities as follows: ready, executing, inhibited, and invalid. Ready means that the task is waiting to be scheduled to core. Inhibited means the core is waiting for something else such as an accelerator to finish its job. Executing means the core is actively working on the task. Invalid means the task is not a valid task.

In operation, queue manager 12 provides a frame descriptor to work scheduler 14 that in turn defines a plurality of tasks to be performed under the direction of task manager 16. Task manager 16 assigns tasks to cores 18, 20, 22, and 24. Cores 18, 20, 22, and 24 begin running the assigned tasks which may include a first task assigned to core 18 and other tasks assigned to cores 20, 22, and 24. The first task may include a job that is a software operation that core 18 may perform on its own. The first task may also include a job that requires an accelerator such as accelerator 28. In such case, core 18 requests use of an accelerator from task manger 16 and stores context information for that stage of the task in a context storage buffer in core 18. Task manager 16 passes that job to an accelerator that can perform the job. If accelerator 28 can perform the job, task manager 16 may assign the job to accelerator 28. After task manager 16 assigns the job to accelerator 28, core 18 is then available for task manger 16 to assign it a second task. While accelerator 28 is executing the job it has been assigned, core 18 may begin the second task or it may be inhibited as it waits for the accelerator 28 to complete the job. When accelerator 28 finishes its assigned job, accelerator 28 provides an output pointer and completion status information to task manager 16. Core 18 may still be performing the second task if it was not inhibited. Another core, such as core 20, may be available for performing tasks at this point. In such case task manager fetches the context information from core 18 and assigns the first task to core 20 while also providing the context information to core 20. With core 20 now having the context information, core 20 can continue with the first task. When a context is switched to a different core, task status info 26 is updated indicating that core 20 is now assigned to the first task. Also the executing of the task by core 20 will be entered in task status info 26.

When task manager 16 accesses the context information from a core in order to move a task from one core to another core, task manager also receives other information relative to the task that is to be continued. For example, if an accelerator is to be used next in executing the task, additional information beyond the context information that would be passed from the core to task manager 16 include identification of the particular type of accelerator, additional information, if any, about the attributes of the accelerator, inband information, if any, that would be passed to the accelerators as output pointers or command attributes, and input/output pointers.

Thus it is seen that packet data is processed in the form of tasks in which context switching is not just implemented for a single core but is able to switch context information from one core to another to provide more efficient execution of the tasks. In effect when task manager 16 detects that the situation is right to transfer context from one core to another, Task manager 16 migrates tasks in ready state between cores without the cores knowledge. A core may not have information about other cores or tasks in the system and in such case cannot initiate the migration. Task manager 16 accesses the context information from one core and transfers it to a second core which then executes the task. Thus task manager 16 may be viewed as migrating execution of a task from one core to another that includes transferring the context information.

When a packet data is received, WRIOP 34 provides the frame information to queue manager 12 and loads the data in memory 38. The packet data is processed through cores 18, 20, 22, and 24 that access memory 38 as needed. When a packet data is output by WRIOP 34, the data is read from memory 38 and formatted using frame information provided by queue manager 12.

Figure 2:
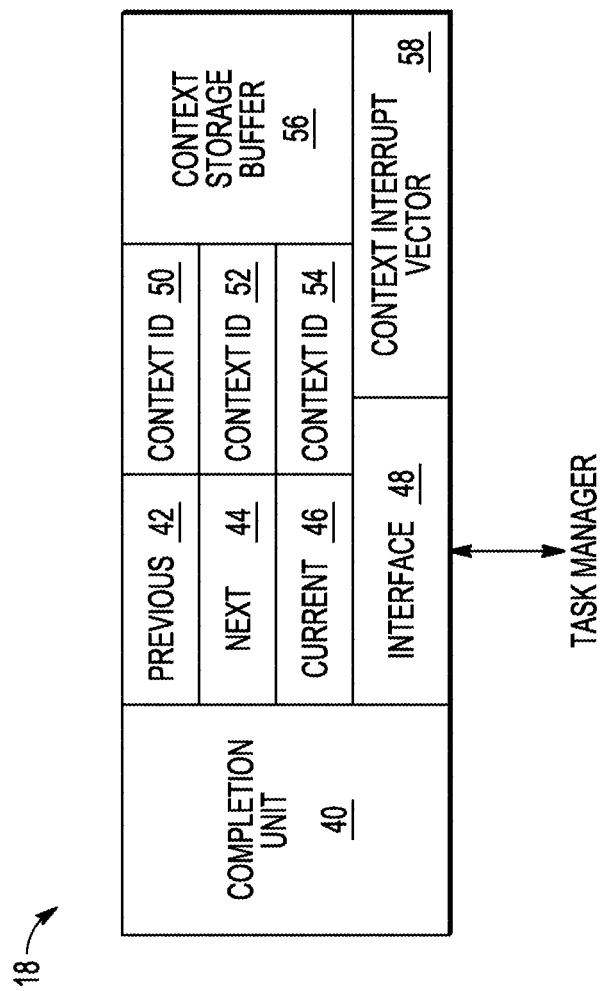
FIG. 2 is a block diagram of a portion of a core of the multi-core system of FIG. 1.

Shown in FIG. 2 is core 18 in more detail. As shown, core 18 comprises an interface 48, coupled to task manager 16, a completion unit 40 for performing tasks, a current register 46 that is continuously updated as operations used in the course of performing tasks are performed, next register 44 that contains the context information needed for the next task in the case of a context switch, a previous register for receiving the context information from current register 46 in the event of the context switch, a context ID 50 for identifying the context information for previous register 42, a context ID 52 for identifying the context information for previous register 44, a context ID 54 for identifying the context information for previous register 44, a storage buffer 56 for storing context information that is used to load register 44 and to store context information from previous register 42.

While current register 46 is regularly updated during the execution of the current task being executed by core 18, next register 44 is loaded with the context of the next task to be performed by core 18. When the current task has been executed to a point where that task is either finished or to be continued without requiring core 18, core 18 can then switch to the task whose context information is stored in next register 44. This transfer to the next task includes a transfer of the contents of next register 44 to current register 46 simultaneously with a transfer of the contents of current register to previous register 42. Data transfer from one register to another can be done in one clock cycle. Thus register 46 can be updated in one clock cycle and the task can begin immediately after that. On the other hand a transfer of data from a register, such as register 42, takes multiple cycles to transfer to context storage buffer 56. These cycles required to transfer to context storage buffer 56 do not delay core 18 from continuing the task because current register 46 has already been updated. By having next register 44 already loaded with the context information of the task to be performed next and the presence of previous register 42, there is no delay in switching tasks due to the time required to load context storage buffers 56.

Thus with the ability to both transfer tasks from one core to another for a task using context switching and to reduce delay in switching tasks, the ability to utilize cores in a multi-core system efficiently is achieved. This can, for example, reduce overhead.

By now it should be appreciated that there has been provided a method includes executing a context switch instruction by a task in a first processing core. The method further includes accessing context information for the task in the first processing core by a task manager external to the first processing core. The method further includes providing the context information from the task manager to a second processing core. The method further includes migrating execution of the task to the second processing core. The method may further include further processing at least a portion of the task in a hardware accelerator coupled to the task manager and inhibiting further execution of the task in the first processor until the hardware accelerator completes processing the at least a portion of the task. The method may further include task manager loading context information to a context storage buffer in the first processing core, the first processing core loading the context information from the context storage buffer to a next context slot and the first processing core assigning a context identifier to the context information in the next context slot. The method may further include.

Also disclosed is a multi-core processing system including a first processing core and a second processing core. The multi-core processing system further includes a task manager coupled to the first and second processing cores, wherein the task manager is operable to receive context information of a task from the first processing core and provide the context information to the second processing core, to enable the second processing core to continue executing the task using the context information. The multi-core processing system may have a further characterization by which the first processing core is operable to execute a context switch instruction and the task manager maintains a status of tasks in the first and second processing cores. The multi-core processing system may have a further characterization by which the context switch instruction performs a function call to an accelerator via the task manager. The multi-core processing system may have a further characterization by which the context switch instruction allows the task manager to access information regarding at least one of a group consisting of: a pointer to an input data structure for an accelerator operation, a pointer to an output data structure for the accelerator operation, an accelerator function call attribute, an accelerator selector, and a return address for the context switch instruction. The multi-core processing system may have a further characterization by which the task manager allows the first processing core to access information regarding at least one of a group consisting of: an output pointer that indicates an output data structure for an accelerator operation, an accelerator operation status, a context identifier for a task to be loaded by the first processing core, and a starting address for the task to be loaded by the first processing core. The multi-core processing system may have a further characterization by which the task manager is operable to execute a pseudo-interrupt to continue processing the task in the first processing core or the second processing core. The multi-core processing system may have a further characterization by which the first and second processing cores include a current register to store context information of a task being executed and a next register to store a copy of context information of a next task to be executed. The multi-core processing system may include a context storage buffer in each of the first and second processing cores to store a plurality of contexts for multiple tasks.

Disclosed also is a multi-core processing system including a first processing core and a second processing core. The multi-core processing system may further include a hardware accelerator external to the first and second processing cores. The multi-core processing system may further include a task manager external to the first and second processing cores and to the hardware accelerator, the task manager is configured to communicate with the first and second processing cores and the hardware accelerator, migrate a task from the first processing core to the second processing core by moving context information for the task from the first processing core to the second processing core, issue a pseudo-interrupt to continue executing the task in the first or second processing core, and receive a command to access the hardware accelerator for the task in the first processing core. The multi-core processing system may have a further characterization by which the task in the first processing core is configured to execute a context switch instruction to command the task manager to perform one of a group consisting of distribute further processing of the task to the hardware accelerator, and schedule another task in the first processing core. The multi-core processing system may have a further characterization by which when the first processing core executes the context switch instruction, the task manager moves the context of the task in the first processor core to a context storage buffer in the second processor core. The multi-core processing system may have a further characterization by which, when the first processing core executes the context switch instruction to distribute further processing of the task to the hardware accelerator, the task in the first processing core enters a halted mode that prevents the first task from being further executed by the first processing core until the further processing in the hardware accelerator is complete. The multi-core processing system may have a further characterization by which the task manager allows the first processing core to access information regarding at least one of a group consisting of: an output pointer that indicates an output data structure for an accelerator operation, an accelerator operation status, a context identifier for a task to be loaded by the first processing core, and a starting address for the task to be loaded by the first processing core. The multi-core processing system may have a further characterization by which the first and second processing cores include a current register to store context information of a task being executed, a next register to store a copy of context information of a next task to be executed, and a previous register to store a copy of context information of a previously executed task. The multi-core processing system may have a further characterization by which a first memory region accessible by the first processing core to store a plurality of contexts for a set of tasks and a second memory region accessible by the second processing core to store a plurality of contexts for another set of tasks. The multi-core processing system may have a further characterization by which the task manager includes status information for the context information of the tasks in the first and second processing cores. The multi-core processing system may have a further characterization by which the status information for each of the tasks includes a task identifier, a core identifier, a context identifier, and a status indicator for the task.

Although the invention is described herein with reference to specific embodiments, various modifications and changes can be made without departing from the scope of the present invention as set forth in the claims below. For example, a different resources than accelerators may be used by the cores in accomplishing tasks. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   processing packet data in form of tasks in a multi-core system;
   executing a context switch instruction for a first task in a first processing core;
   accessing first context information for the first task in the first processing core by a task manager externally coupled to the first processing core in response to the execution of the context switch instruction;
   providing the first context information from the task manager to a context storage buffer in a second processing core during execution of a second task in the second processing core;
   storing the first context information in a next register of the second processing core from the context storage buffer of the second processing core during execution of the second task in the second processing core, wherein the next register stores context information of a next task to be executed in the second processing core;
   migrating, by the task manager, execution of the first task from the first processing core to the second processing core during execution of the second task in the second processing core;
   transferring second context information of the second task from a current register of the second processing core to a previous register of the second processing core during a context switch from the second task to the first task in the second processing core; and
   transferring the first context information for the first task from the next register to the current register during the context switch from the second task to the first task in the second processing core.

2. The method of claim 1 further comprising:
   further processing at least a portion of the first task in a hardware accelerator coupled to the task manager; and inhibiting further execution of the first task in the first processor until the hardware accelerator completes processing the at least a portion of the task.

3. The method of claim 1 further comprising:
the task manager loading third context information to a context storage buffer in the first processing core;
the first processing core loading the third context information from the context storage buffer to a next context register of the first processing core; and
the first processing core assigning a context identifier to the third context information in the next context register of the first processing core.

4. A multi-core processing system comprising:
a first processing core;
a second processing core, the first and second processing cores for processing packet data in form of tasks;
a task manager coupled to the first and second processing cores, wherein the task manager is operable to receive first context information of a first task from the first processing core and provide the first context information to a context storage buffer in the second processing core while the second processing core is executing a second task, the first context information is stored in a next register of the second processing core from the context storage buffer of the second processing core while the second processing core is executing the second task, wherein the next register stores context information of a next task to be executed in the second processing core, to enable the second processing core to continue executing the first task using the context information stored in the next register upon completion of the second task.

5. The multi-core processing system of claim 4 wherein:
the first processing core is operable to execute a context switch instruction and the task manager maintains a status of tasks in the first and second processing cores.

6. The multi-core processing system of claim 5 wherein:
the context switch instruction performs a function call to an accelerator via the task manager.

7. The multi-core processing system of claim 4 wherein:
the context switch instruction allows the task manager to access information regarding at least one of a group consisting of: a pointer to an input data structure for an accelerator operation, a pointer to an output data structure for the accelerator operation, an accelerator function call attribute, an accelerator selector, and a return address for the context switch instruction.

8. The multi-core processing system of claim 4 wherein:
the task manager allows the first processing core to access information regarding at least one of a group consisting of: an output pointer that indicates an output data structure for an accelerator operation, an accelerator operation status, a context identifier for a task to be loaded by the first processing core, and a starting address for the task to be loaded by the first processing core.

9. The multi-core processing system of claim 4 wherein:
the hardware-task manager is operable to execute a pseudo-interrupt to continue processing the first task in the second processing core.

10. The multi-core processing system of claim 4, wherein the first and second processing cores include:
a current register to store context information of a current task being executed.

11. The multi-core processing system of claim 4 further comprising:

a context storage buffer in each of the first and second processing cores to store a plurality of contexts for multiple tasks.

12. A multi-core processing system comprising:
a first processing core;
a second processing core, the first and second processing cores for processing packet data in the form of tasks;
a hardware accelerator external to the first and second processing cores; and
a task manager coupled to the first and second processing cores and to the hardware accelerator, the task manager is configured to:
communicate with the first and second processing cores and the hardware accelerator;
migrate a first task from the first processing core to the second processing core by moving context information for the first task from the first processing core to a context storage buffer in the second processing core while the second processing core is executing a second task, the first context information is stored in a next register of the second processing core from the context storage buffer of the second processing core while the second processing core is executing the second task: wherein the next register stores context, information of a next task to be executed in the second processing core;
issue a pseudo-interrupt to continue executing the first task in the second processing core; and
receive a command to access the hardware accelerator for the first task.

13. The multi-core processing system of claim 12 wherein:
the first task in the first processing core is configured to execute a context switch instruction to command the task manager to perform one of a group consisting of: distribute further processing of the first task to the hardware accelerator, and schedule another task in the first processing core.

14. The multi-core processing system of claim 13 wherein:
when the first processing core executes the context switch instruction to distribute further processing of the first task to the hardware accelerator, the first task in the first processing core enters a halted mode that prevents the first task from being further executed by the first processing core until the further processing in the hardware accelerator is complete.

15. The multi-core processing system of claim 13 wherein:
when the first processing core executes the context switch instruction, the task manager moves the context of the first task in the first processor core to a context storage buffer in the second processor core.

16. The multi-core processing system of claim 12 wherein:
the task manager allows the first processing core to access information regarding at least one of a group consisting of: an output pointer that indicates an output data structure for an accelerator operation, an accelerator operation status, a context identifier for a task to be loaded by the first processing core, and a starting address for the task to be loaded by the first processing core.

17. The multi-core processing system of claim 12, wherein the first and second processing cores include:
a current register to store context information of a current task being executed; and a previous register to store a copy of context information of a previously executed task.

18. The multi-core processing system of claim 12 further comprising:
    a first memory region accessible by the first processing core to store a plurality of contexts for a set of tasks; and
    a second memory region accessible by the second processing core to store a plurality of contexts for another set of tasks.

19. The multi-core processing system of claim 12 wherein the task manager comprises:
    status information for the context information of the tasks in the first and second processing cores.

20. The multi-core processing system of claim 19 wherein the status information for each of the tasks includes a core identifier, a context identifier, and a status indicator for the task.

\* \* \* \* \*